United States Patent [19]

del Santo

[11] Patent Number: 4,752,665

[45] Date of Patent: Jun. 21, 1988

[54] APPARATUS FOR SECURING WASTE FRAGMENTS ON A SPARK EROSION MACHINE

[75] Inventor: Cesare del Santo, Minusio, Switzerland

[73] Assignee: AG für industrielle Elektronik AGIE Losone b. Locarno, Losone, Switzerland

[21] Appl. No.: 838,995

[22] Filed: Mar. 12, 1986

[30] Foreign Application Priority Data

Mar. 15, 1985 [DE] Fed. Rep. of Germany ....... 3509418

[51] Int. Cl.$^4$ ............................................. B23H 7/02
[52] U.S. Cl. ................................ 219/69 W; 219/69 R
[58] Field of Search ..................................... 269/13–15; 219/69 W, 69 M; 204/206, 224 M

[56] References Cited

U.S. PATENT DOCUMENTS

| | | | |
|---|---|---|---|
| 2,526,423 | 10/1950 | Rudorff | 219/69 W |
| 2,962,153 | 11/1960 | Brodbeck | 269/13 |
| 3,701,520 | 10/1972 | Pinnolis et al. | 269/13 |
| 4,227,064 | 10/1980 | Muegge et al. | 219/69 W |
| 4,387,286 | 6/1983 | Inoue | 219/69 W |
| 4,467,166 | 8/1984 | Gamo et al. | 219/69 W |
| 4,484,052 | 11/1984 | Inoue | 219/69 W |
| 4,486,642 | 12/1984 | Inoue | 219/69 W |
| 4,521,661 | 6/1985 | Inoue | 219/69 W |
| 4,547,646 | 10/1985 | Briffod | 219/69 W |

FOREIGN PATENT DOCUMENTS

| | | | |
|---|---|---|---|
| 2755724 | 6/1983 | Fed. Rep. of Germany | |
| 653995 | 5/1951 | United Kingdom | 269/15 |
| 973292 | 11/1982 | U.S.S.R. | 269/14 |

Primary Examiner—A. D. Pellinen
Assistant Examiner—Geoffrey S. Evans
Attorney, Agent, or Firm—Neuman, Williams, Anderson & Olson

[57] ABSTRACT

For the securing and removal of waste fragments from eroded openings of a workpiece on a spark erosion machine, a collecting plate is provided below the workpiece to retain the waste fragments. In the case of an X/Y-movement of the workpieces, the waste fragments move over the top of the collecting plate. A collecting container is arranged on the edge of the collecting plate and the waste fragments drop into it in the case of a corresponding X/Y-movement of the workpiece. According to another variant, a lifting cylinder can be positioned above the workpiece and with a gripper (e.g. a magnet) grips the waste fragments and draws them upwards out of the eroded opening. By moving the lifting cylinder, the waste fragment is then placed on a conveyor belt or can be directly conveyed into the collecting container.

23 Claims, 3 Drawing Sheets

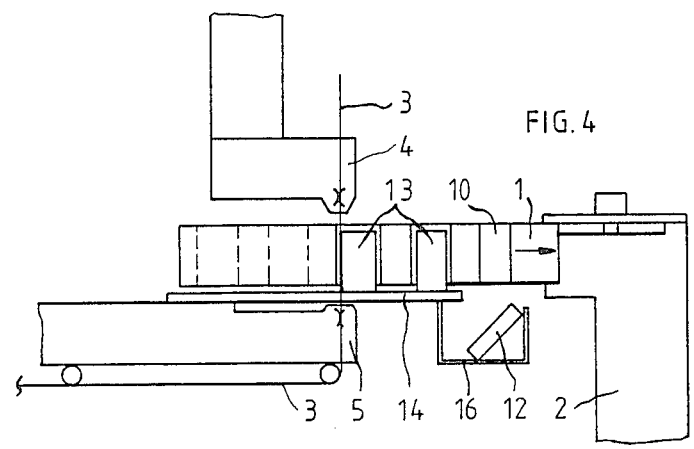
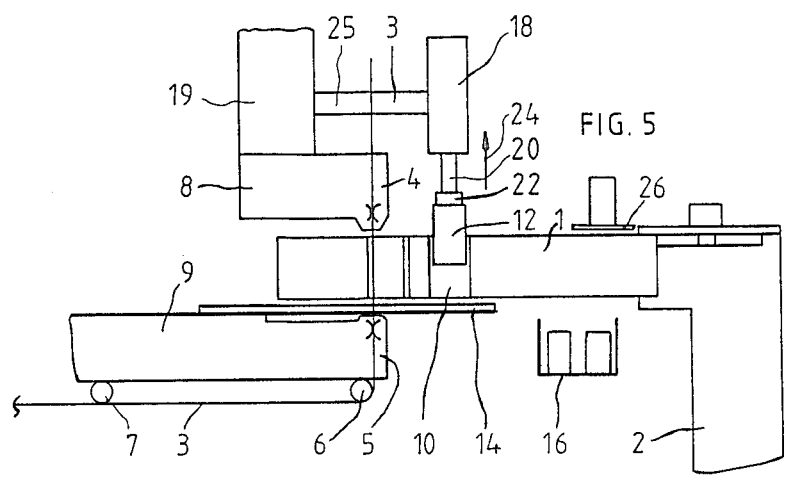

APPARATUS FOR SECURING WASTE FRAGMENTS ON A SPARK EROSION MACHINE

BACKGROUND OF THE INVENTION

The present invention relates to an apparatus for securing waste fragments machined from a workpiece on a spark erosion machine.

One such apparatus is generally known from German patent No. 27 55 724. A collecting plate for the waste fragments is formed by part of the workpiece supporting table, which is movable in one direction (e.g., the Y-direction) together with the workpiece and is consequently displaced relative to the wire electrode. Therefore, the supporting table must have an elongated slot in the Y-direction, whose length corresponds to the complete movement path between the electrode and the workpiece. However, in the other movement direction (X-direction) the supporting table is not movable, so that during a cutting movement in this direction the workpiece moves relative to the table. In other words, the supporting table remains stationary with respect to the electrode during a cutting advance in the X-direction. Thus, in this apparatus two additional sliding bearings are required for the supporting table or collecting plate, namely one sliding bearing permitting a displacement of the supporting table with respect to the bottom of the machine in the Y-direction and a second sliding bearing permitting a relative displacement of the table with respect to the cross-coordinate support in the X-direction. This is very complicated and costly. In addition, as a result of the slot formed in the supporting table in the Y-direction, the supporting table must be larger than the movement path, so that adequate stability is ensured. Thus, either the possible movement path is restricted or the machine is made more cumbersome and bulky. Finally, with this construction, it is only possible to remove the waste fragments from above the workpiece.

In general, when automatically cutting openings from a workpiece by means of spark erosion (e.g., in successively cut dies), the cut out "waste material" must be secured and removed.

For this purpose, apart from the aforementioned German patent No. 27 55 724, the following systems are known. Another possibility consists of the workpiece material being completely eroded away in the opening, so that there is no waste material to remove. However, this requires a longer eroding time, consumes unnecessary energy, and leads to an unnecessarily large consumption of electrode wire.

In another method, on cutting or eroding openings, the waste fragment is secured by holding webs connected to the workpiece, i.e. the opening is not completely cut. During a subsequent working process the holding web is broken away. However, this requires a further working process and also normally requires a reworking of the burr left behind after breaking away the holding web.

SUMMARY OF THE INVENTION

The problem addressed by the present invention is to obviate these disadvantages of the prior art. Therefore the problem addressed by the invention is to so improve an apparatus of the aforementioned type, that the waste fragments can be easily removed, while having a simple apparatus construction.

According to one embodiment of the invention, waste fragments obtained during cutting or erosion are supported on a collecting plate arranged just below the workpiece. The fragments are then subsequently removed, while the collecting plate is kept rigid with respect to the electrode. The workpiece is movable relative to the collecting plate in all cutting directions (X and Y-directions). In other words, the collecting plate is rigidly connected to the lower wire guidance head, so that only a relatively small hole is required in it for the passage of the electrode, in lieu of a slot extending through the entire plate length. Further, no additional bearings are required for the collecting plate.

According to a variant of the invention, fragment removal takes place in that at the end of the collecting plate a collecting container is provided, into which the fragments fall if the workpiece is moved to such an extent that the eroded opening in the workpiece comes to rest above the collecting container.

In another variant which is preferably used with conical openings and openings of upwardly widening radius, a lifting cylinder is provided which draws the waste material upwards out of the eroded opening electromagnetically or mechanically, such as by gripping or suction means, and advances the waste material by a controlléd movement òf the lifting cylinder to the collecting container or a conveyor belt.

In another variant, the lower arm of the machine has an opening through which the waste fragments fall. Preferably the lower arm is hollow, it being possible to convey the waste fragments away from the working zone, for example, by means of a cylinder-controlled slide member or a conveyor belt. Manual removal is naturally also possible. In this variant, machining is impeded to the minimum extent by the waste fragments, and the workpiece fixing device does not need to take into account a collecting container.

Thus, the invention makes it possible to completely cut openings in a workpiece with the waste fragments not being prejudicial during the working of other openings. There is naturally no need for a reworking of the workpiece.

BRIEF DESCRIPTION OF THE DRAWINGS

The invention is described in greater detail hereinafter relative to illustrative embodiments and the attached drawings, which show:

FIG. 4 A view similar to FIG. 3 in which certain waste fragments have already been removed while the erosion process is still taking place on other openings.

FIG. 5 A diagrammatic side view of the spark erosion machine in which the waste fragments are removed from above.

DETAILED DESCRIPTION OF THE PREFERRED EMBODIMENTS

Figure 1:
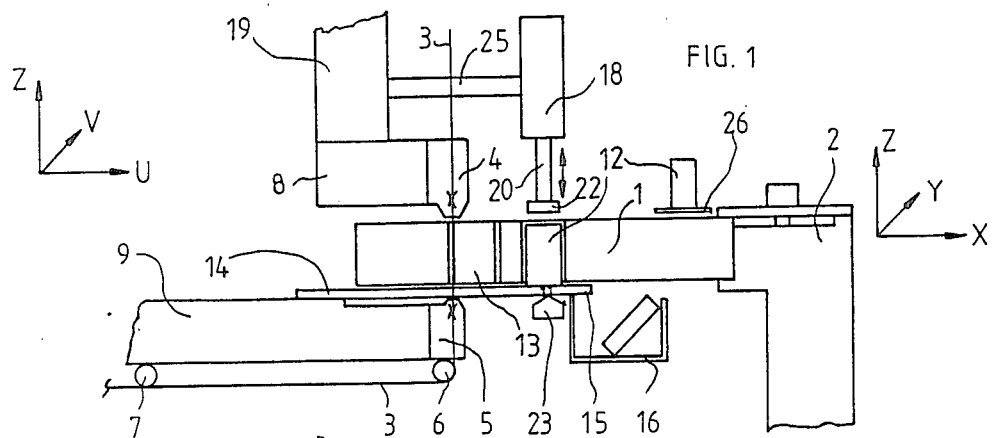
FIG. 1 A diagrammatic side view of a spark erosion machine with an apparatus according to the invention, two variants of the invention being shown.

The same reference numerals in the individual drawings relate to the same parts. A workpiece 1, which is to be machined by an eroding process with a number of openings, is clamped in a conventional manner in a workpiece clamping or mounting system 2 and can therefore be moved in the X/Y-direction by means of workpiece carriages, not shown. The eroding process takes place in known manner by a continuously moving wire electrode, which is guided above and below the workpiece 1 in wire guidance heads 4, 5. The wire is supplied and removed in a known manner by the diagrammatically indicated guide pulleys 6, 7. The wire guidance heads 4, 5 are held in known manner on optionally displaceable arms 8, 9.

Reference numerals 10 and 11 indicate two separate openings in workpiece 1, which have been produced by erosion. In these openings are located the waste fragments 12, 13, which need to be secured and removed. For securing the waste fragments, a collecting plate 14, which extends laterally over the erosion zone, is provided at a very limited distance from the lower edge of the workpiece. The distance between the surface of the collecting plate 14 and the bottom of the workpiece 1 is very small and preferably between 0.1 and 0.2 mm. Collecting plate 14 can conveniently be fixed to the lower arm 9. It is constructed in such a way that the wire electrode 3 can pass through it, e.g. through an opening.

Figure 2:
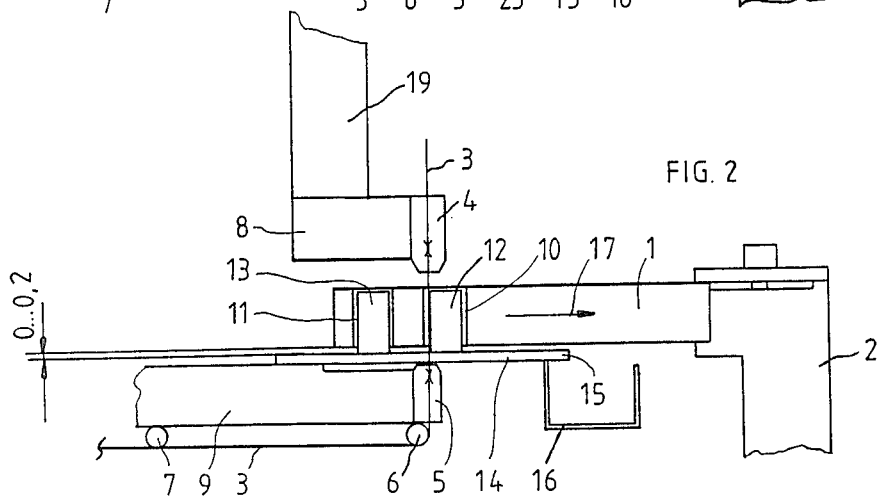
FIG. 2 A similar diagrammatic side view, in which the waste fragments may fall into a collecting container.
Figure 3:
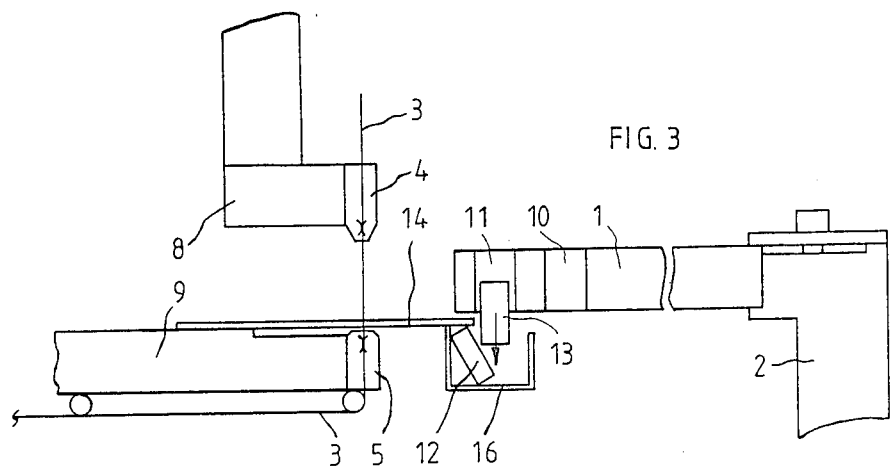
FIG. 3 A view similar to FIG. 2, but in the removal state where the erosion process has concluded.

If the opening 10 has been completely machined, as shown in FIG. 2, then as a result of its own weight, the waste fragment drops the short distance down to the collecting plate 14, where it is then held. Another opening can then be eroded, for which purpose the workpiece 1 is moved relative to the wire electrode by an X/Y-displacement. During this movement, the waste fragments slide on the surface of collecting plate 14. As a function of the arrangement of the workpiece openings to be eroded, through an X/Y displacement of the workpiece an eroded opening comes to the edge 15 of collecting plate 14 where a collecting container 16 is arranged, into which drops the waste fragment. As can be seen in FIG. 4, this corresponding movement of workpiece 1 takes place at the same time other openings are being machined. As can be seen from FIGS. 2 and 3, the cutting sequence of the individual openings can be predetermined so that all the openings are successively eroded and the waste fragments (e.g. 12 and 13) are held on collecting plate 14 until, at the end of the erosion process, workpiece 1 is moved in the direction of arrow 17 in FIG. 2, so that the waste fragments 12, 13 drop successively into the collecting container 16, as shown in FIG. 3.

The removal possibility described in connection with FIGS. 2 to 4 can naturally only be performed for those machined openings in which the waste fragment can drop downwards out of the workpiece, as in the case of a parallel cut or a conical cut with an increasing radius downwards.

In the case of conical parts having the conical opening upwards, the invention provides an alternative embodiment for the removal system. For this situation a lifting cylinder 18 is provided (FIGS. 1 and 5), which is fitted to the upper arm 8 and can be moved and operated by means of a control mechanism 19 which may be pneumatically operated. The lifting cylinder 18 has a downwardly extendible shaft 20, which is movable in the direction of arrow 21 (FIG. 1). At its lower end it carries a "gripping member" 22, which can for example be an electromagnet, a mechanical gripper, or a suction system. Particularly if constructed as an electromagnet, the gripping member 22 can additionally have an ejector in the form of a ram, which is separately movable in the Z-direction. This ram, not shown, serves to reliably separate the waste fragment from the gripping member, which is always ensured in the case of an electromagnet. Opposite to the lifting cylinder 18, it is possible to provide on the bottom of the collecting plate 14 an ejector arrangement 23, which acts through an opening in the collecting plate 14 on the waste part located there. For example, a compressed air nozzle can be provided for this purpose, or a mechanical ejector in the form of a ram. The ejector arrangement 23 can, particularly when using a tong-type gripper for the gripping member 22, force the waste fragment so far upwards out of workpiece 1 that it can be grasped laterally by the gripping member.

As soon as the corresponding relative X/Y-displacement of the workpiece 1 has led to a waste fragment being positioned below the lifting cylinder 18, the latter is actuated so that its gripping member grips the waste fragment and draws it upwards out of the opening in the direction of arrow 24 (FIG. 5). By means of the control mechanism 19 through the displacement of its support arm 25 the lifting cylinder 18 can be moved in such a way that it moves the gripped waste fragment to a conveyor belt 26 located above the workpiece. Through a corresponding actuation of gripper 22, e.g. switching off the current of an electromagnet, the waste fragment is then placed on the conveyor belt 26 and is conveyed from there to the collecting container 16 or a further collecting container. In certain circumstances it is also possible to design the collecting container 16 in such a way that it still remains accessible from above in all possible positions of the workpiece 1, that is, it is not completely covered by the latter, so that it is possible to move the lifting cylinder over this opening and from there the waste fragment is allowed to drop directly into the collecting container 16. In this case the conveyor belt 26 can be omitted.

According to a variant of the invention, the lifting cylinder 18 can be separately moved in the Z-direction with respect to the upper arm 8, for example, by a bearing on a carriage, which is indicated by the control mechanism 19.

However, in modern spark erosion machines the upper arm 8 is generally separately displaceable particularly in a plane parallel to the X-Y plane which is normally indicated by the coordinates UV, as well as in the vertical Z-direction. To simplify the design in this case, the support arm 25 of the lifting cylinder 18 can be directly coupled to the upper arm 8, so that there is no need for an independent drive for displacing lifting cylinder 18 in the Z-direction, thus considerably reducing costs. However, account must be taken of the fact that during the removal of the waste fragments by the lifting cylinder 18, the erosion process is interrupted. This variant is naturally not only possible in the case of conical workpieces having its conical opening upwards, but also for the removal of other waste fragments.

It is also possible to arrange the lifting cylinder directly above the collecting container, the workpiece then being moved away by X/Y-displacement so that the lifting cylinder can allow the gripped waste fragment to drop downwards into the collecting container.

Figure 6:
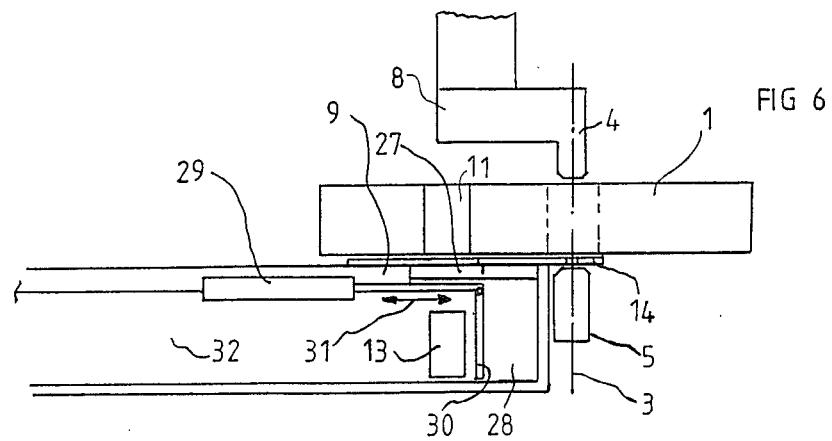
FIG. 6 A diagrammatic side view of the spark erosion machine in which the waste fragments are removed through an opening in the lower arm, a cylinder-controlled slide being provided to facilitate removal.
Figure 7:
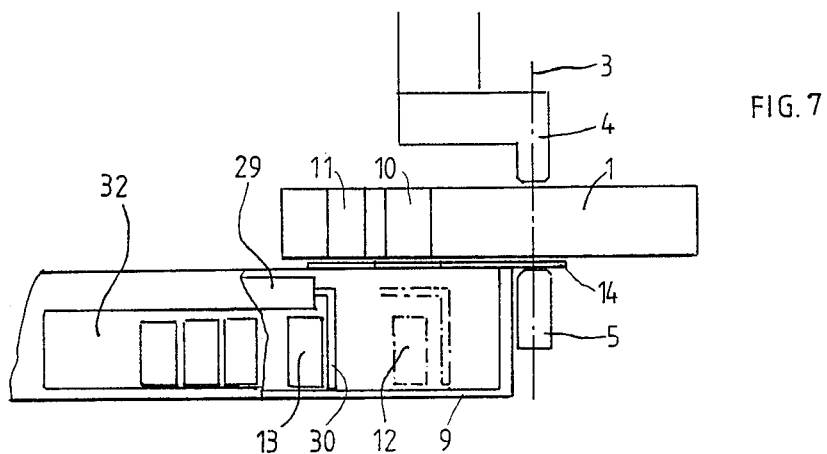
FIG. 7 A view similar to FIG. 6, further illustrating the operation of the cylinder-controlled slide.
Figure 8:
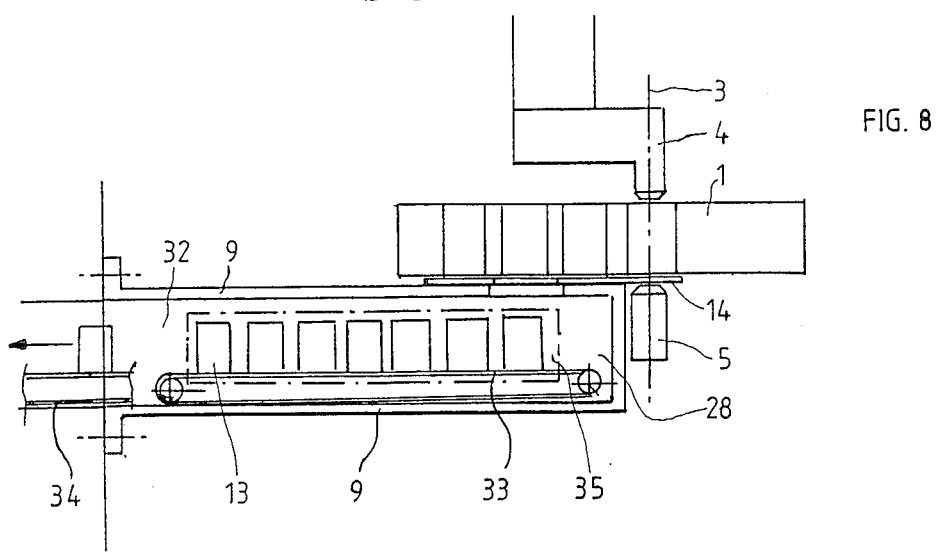
FIG. 8 is Another variant of the invention, in which the waste fragments are removed through an opening in the lower arm of the machine and transported away by means of a controlled conveyor belt.

In the embodiments shown in FIGS. 6 to 8, removal takes place through an opening 27 in the lower machine arm 9. According to one variant, the collecting plate 14 only extends up to the edge of opening 27, while in another variant the collecting plate 14 has an opening corresponding to opening 27.

In the embodiments of FIGS. 6 to 8 the lower machine arm 9 is hollow, so that the waste fragments can drop into its cavity 28. To remove the fragments from cavity 28, the cavity must naturally have a lateral opening 32, which is preferably at the end of arm 9 remote from the working area.

In the variant according to FIGS. 6 and 7, the waste fragments which have dropped into cavity 28 are laterally conveyed in the direction of the discharge opening 32 by means of a slide 30 which is operated by a cylinder 29. Slide 30 can be reciprocated in the direction of arrow 31 (FIG. 6). Its movement is controlled as a function of the X/Y-movement of workpiece 1, so that a dropped waste fragment is always conveyed away from the area below opening 27, to prevent the accumulation of waste fragments. The working stroke of cylinder 29 can be relatively short because, as shown in FIG. 7, successive waste fragments in each case move the waste fragment in the direction of the discharge opening 32. A collecting container can then be arranged at discharge opening 32. It is also possible to manually remove the waste fragments.

In the variant according to FIG. 8 the waste fragments in the cavity 28 are conveyed away by a controlled conveyor belt, whose one end extends at least below opening 27 and whose discharge-side end roughly extends up to the discharge opening 32. This conveyor belt can run continuously but it is preferable to drive it in a controlled, timed manner, namely whenever a waste fragment has dropped down. Conveyor belt 33, which is located in the cavity 28 of lower arm 9 can be followed in the vicinity of discharge opening 32 by a further, extended conveyor belt 34, which conveys the waste fragments to a remote collecting container or some other waste material collection point. Conveyor belts 33, 34 can naturally be combined to form a single conveyor belt. It is also possible to allow the waste fragments to drop into a conveying container 35 or onto a pallet, with the container 35 or pallet then being conveyed away by the conveyor belts 33, 34.

From these teachings, alternate embodiments and modifications will be apparent to those skilled in the art. These, and the embodiments described or suggested herein as combinations of the described features, are considered to be within the true spirit and scope of the present invention.

What is claimed is:

1. An apparatus for securing waste fragments on a wire cutting spark erosion machine having a lower wire guidance head and an upper wire guidance head to guide a wire electrode through a working zone of the spark erosion machine, the waste fragments being formed during the machining operation as the wire electrode severs from a conductive workpiece a portion of the workpiece such as when an opening is cut in the workpiece, comprising a collecting plate for supporting the waste fragments, where the collecting plate is arranged below and in close proximity to the workpiece and extends laterally beyond the working zone of the spark erosion machine, the collecting plate being fixed with respect to a holding arm for the lower wire guidance head of the spark erosion machine and positioned above the lower wire guidance head.

2. An apparatus according to claim 1, wherein the distance between the top of the collecting plate and the bottom of the workpiece is less than approximately 0.2 mm.

3. An apparatus according to claim 1, wherein the collecting plate extends sufficiently far in the X-Y plane that it covers the complete movement path of the relative displacement between the workpiece and the wire electrode.

4. An apparatus according to claim 3, wherein the collecting plate had a discharge opening through which waste fragments can drop into a collecting container arranged below said opening.

5. An apparatus according to claim 1, wherein a collecting container is arranged on a lateral edge of the collecting plate and into which the waste fragments drop when, through a controlled X/Y-movement of the workpiece relative to the wire electrode, the openings formed in the workpiece and the waste fragments therein assume a position above the collecting container.

6. An apparatus according to claim 1, wherein the lower arm of the spark erosion machine is positioned below the collecting plate and is provided with an opening laterally alongside the working area through which the waste fragments can drop.

7. An apparatus according to claim 6, wherein one edge of the collecting plate is adjacent to the opening in the lower arm.

8. An apparatus according to claim 6, wherein the collecting plate includes an opening corresponding to the opening of the lower arm.

9. An apparatus according to claim 6, wherein the lower arm of the spark erosion machine is hollow and has a lower discharge opening at the end remote from the erosion zone.

10. An apparatus according to claim 2, wherein the distance between the top of the collecting plate and the bottom of the workpiece is between 0.1 and 0.2 mm.

11. An apparatus for securing waste fragments on a wire cutting spark erosion machine, the waste fragments being formed during the machining operation as the wire electrode severs from a conductive workpiece a portion of the workpiece such as when an opening is cut in the workpiece, comprising a collecting plate for supporting the waste fragments, where the collecting plate is arranged below and in close proximity to the workpiece and extends laterally beyond the working zone of the spark erosion machine, the collecting plate being fixed with respect to a holding arm for the lower wire guidance head of the spark erosion machine; wherein the lower arm of the spark erosion machine is allow and has a lower discharge opening at the end remote from the erosion zone and the lower arm is positioned below the collecting plate and is provided with an opening laterally alongside the working area through which the waste fragments can drop, and wherein a conveyor belt is arranged in the cavity of the lower arm, which extends below the opening and conveys dropped waste fragments in the direction of the discharge opening of the lower arm.

12. An apparatus according to claim 11, wherein the conveyor belt is driven in timed controlled manner.

13. An apparatus according to claim 11, wherein an extended conveyor belt is linked with the discharge opening of the lower arm.

14. An apparatus according to claim 11, wherein a collecting means is located on the conveyor belt for receiving the waste fragments.

15. An apparatus for securing waste fragments on a wire cutting spark erosion machine, the waste fragments being formed during the machining operation as the wire electrode severs from a conductive workpiece a portion of the workpiece such as when an opening is cut in the workpiece, comprising a collecting plate for supporting the waste fragments, where the collecting plate is arranged below and in close proximity to the workpiece and extends laterally beyond the working zone of the spark erosion machine, the collecting plate being fixed with respect to a holding arm for the lower wire guidance head of the spark erosion machine; wherein a lifting cylinder is arranged above the workpiece and is laterally displaced with respect to the wire electrode in the X/Y-plane, a means for gripping a waste fragment being fixed to a controllable, downwardly extendible cylinder rod provided with the lifting cylinder.

16. An apparatus according to claim 15, wherein the gripping member is an electromagnet, a gripping tong, a suction mechanism, or the like.

17. An apparatus according to claim 15, wherein an ejection arrangement is arranged opposite to the lifting cylinder on the bottom of the collecting plate and through an opening in the latter exerts an upwardly directed force on the waste fragments.

18. An apparatus according to claim 17, wherein the ejection arrangement is a compressed air nozzle, a mechanical ejector or the like.

19. An apparatus according to claim 15, wherein the lifting cylinder is displaceable in the X/Y-direction.

20. An apparatus according to claim 15, wherein a conveyor belt movable by the lifting cylinder for conveying away the waste fragments is arranged above the workpiece.

21. An apparatus according to claim 15, wherein a controlled displaceable ram is additionally provided in the gripping member for ejecting waste fragments from the latter.

22. An apparatus according to claim 15, wherein the lifting cylinder is displaceable together with the upper arm in the vertical direction.

23. An apparatus for securing waste fragments on a wire cutting spark erosion machine, the waste fragments being formed during the machining operation as the wire electrode severs from a conductive workpiece a portion of the workpiece such as when an opening is cut in the workpiece, comprising a collecting plate for supporting the waste fragments, where the collecting plate is arranged below and in close proximity to the workpiece and extends laterally beyond the working zone of the spark erosion machine, the collecting plate being fixed with respect to a holding arm for the lower wire guidance head of the spark erosion machine; wherein the lower arm of the spark erosion machine is hollow and has a lower discharge opening at the end remote from the erosion zone and the lower arm is positioned below the collecting plate and is provided with an opening laterally alongside the working area through which the waste fragments can drop, and wherein a controllable cylinder is arranged in the cavity of the lower arm and operates a slide which moves the waste fragments in the cavity in the direction of the discharge opening of the lower arm.

* * * * *

UNITED STATES PATENT AND TRADEMARK OFFICE
CERTIFICATE OF CORRECTION

PATENT NO. : 4,752,665
DATED : June 21, 1988
INVENTOR(S) : Cesare del Santo

It is certified that error appears in the above-identified patent and that said Letters Patent is hereby corrected as shown below:

```
In Column 6, line 58, change "allow" to
      --hollow--.
```

Signed and Sealed this

Fourteenth Day of March, 1989

*Attest:*

DONALD J. QUIGG

*Attesting Officer*    *Commissioner of Patents and Trademarks*